United States Patent Office 3,069,136
Patented Dec. 18, 1962

3,069,136
METHOD OF AND ARRANGEMENT FOR LIMITING THE RUNAWAY SPEED OF DOUBLE CONTROLLED KAPLAN TURBINES
Werner Thuss, Heidenheim (Brenz), Germany, assignor to J. M. Voith G.m.b.H., Heidenheim (Brenz), Germany
Filed Dec. 21, 1959, Ser. No. 860,971
Claims priority, application Germany Dec. 24, 1958
10 Claims. (Cl. 253—143)

The present invention relates to a control arrangement for controlling the runaway speed limiting device for double-controlled Kaplan turbines in conformity with the respective position of the runner and the guide wheel of such turbines.

The magnitude of the runaway speed of a Kaplan turbine at a given height of drop or head and suction height will depend, to a major extent, on the respective coordination between the guide wheel opening $a_0$ and the runner opening $\varphi$. It is known that when maintaining the coordination between guide wheel opening $a_0$ and runner opening $\varphi$ as required for ordinary operation, the maximum possible runaway speed is always less than the absolute maximum possible runaway speed. The absolute maximum possible runaway speed will occur at a coordination between guide wheel and runner opening which deviates from the above mentioned ordinary $a_0$ and $\varphi$ coordination selected with regard to an optimum degree of efficiency. Inasmuch as the coupling between guide wheel opening and runner opening is not rigid and automatic, it is possible that under certain circumstances, a combination or coordination deviating from said ordinary coordination may occur which means that a coordination may occur at which the runaway speed will reach its absolute maximum value.

In view of the disadvantageous consequences of such condition of operation, it is desirable that the runaway speed be limited by suitable devices.

A known arrangement for effecting the desired control comprises a control device with two adjusting elements actuated in a parallel manner by a governor for directly controlling the servomotors for the guide wheel and runner. The purpose of such an arrangement consists, principally, in preventing higher runaway speed than may occur at ordinary $a_0-\varphi$ relationship. To this end, blocking means are provided which, at a certain predetermined position of the guide wheel apparatus, prevents a further closing of the runner end, at a certain predetermined position of the runner, prevents a further opening of the guide wheel apparatus than would correspond to the position determined by the $a_0-\varphi$ relationship pertaining thereto. This arrangement, however, has the drawback that the prescribed $a_0-\varphi$ curve of optimum degree of efficiency cannot be exceeded anywhere even where it would be permissible or desirable with regard to the runaway speed, for instance, when starting the turbine or when carrying out output measurements on said turbine.

It is, therefore, an object of the present invention to provide a control arrangment for limiting the runaway speed of double-controlled Kaplan turbines, which will overcome the above mentioned drawbacks.

It is another object of this invention to provide a control arrangement for limiting the runaway speed of double-controlled Kaplan turbines, which will be more reliable than the heretofore known arrangements set forth above.

It is still another object of this invention to provide a control arrangement as set forth in the two preceding paragraphs, which will make it possible to check the turbines at any desired time, i.e. when the turbines operate at ordinary speed or at increased speed.

It is still another object of this invention to provide a control arrangement of the above mentioned type in which the $a_0-\varphi$ curve of the optimum degree of efficiency can be exceeded within certain limits by corresponding guide wheel-runner opening relationship without initiating a control operation.

These and other objects and advantages of the invention will appear more clearly from the following specification in connection with the accompanying drawings, in which:

FIGURE 1 illustrates by means of a graph the control operations at the respective $a_0-\varphi$ relationships.

FIGURE 2 diagrammatically illustrates an embodiment of a limiting device according to the invention in connection with a double controlled Kaplan turbine, the control member actuating disturbing vanes.

*General Arrangement*

According to the present invention, the turbine is prevented from exceeding a predetermined maximum permissible maximum speed or racing speed. The speed of the turbine, generally, depends on the relationship between the guide wheel opening and the opening of the runner wheel. The present invention accordingly, maintains a predetermined relationship between these openings and between the opening and closing movements of the runner wheel and the guide wheel. More specifically, whenever the speed of the turbine exceeds a predetermined amount, on account of adjustment of either the runner wheel or the guide wheel beyond a permissible amount, a control mechanism or limiting device will be activated.

The control mechanism or limiting device operates first to prevent further increase in the turbine speed and then limits the turbine speed in conformity with the changing relation between the guide wheel opening and the runner wheel opening. The control influence continues until the adjustment of the runner wheel and guide wheel are again in proper relation.

According to this invention the control limit appears as a train of lines composed of individual ordinates and abscissa which train of lines approximates a maximum limiting curve.

According to one embodiment of the invention, the limiting device is hydraulically controlled through the intervention of a relief conduit formed by two valves or slide controlled conduits connecting with the servomotors for the guide wheel and the runner wheel. The limiting device also includes a member operable for introducing blades into the path of fluid entering the turbine to control the rate of fluid flow thereto.

According to another embodiment of the invention, the limiting device consists of a number of conduits interconnecting spaced points of the guide wheel servomotor cylinder and the runner wheel servomotor cylinder. In this arrangement the servomotor pistons are restrained from any substantial amount of movement beyond a predetermined relationship with each other.

Figure 1:
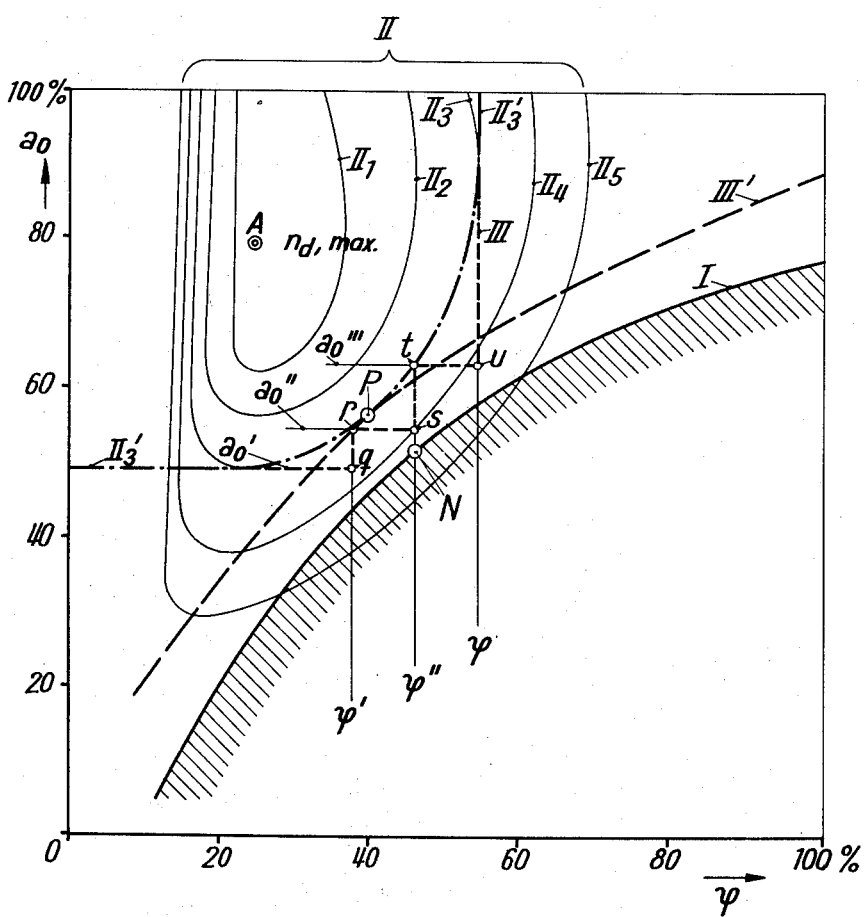

As an example for the selection of predetermined relationships between the guide wheel opening $a_0$ and the running opening $\varphi$ reference may be had to the $a_0\varphi$ diagram of FIG. 1. In FIG. 1, curve I designates those relationships between the guide wheel opening $a_0$ and the runner opening $\varphi$ which are to be maintained during ordinary or stationary condition in order that the turbine will operate at the respective maximum degree of efficiency. Also plotted in the diagram of FIG. 1 are lines of constant runaway speeds—curves II—while the indices 1, 2, 3 . . . applying to the applying to the individual curves II indicate the relationship to the maximum possible runaway speed, and it will be seen from the drawing that this relationship or ratio decreases with increasing index number. The absolute maximum possible runaway speed $n_d$ max. will occur at the relationship betwen guide wheel opening and runner opening pertaining to point A which relationship is located considerably outside of the the normal guide wheel runner opening relationship according to curve I but which has to be considered generally. The runaway speed will vary along curve I and will at the point N reach its maximum value.

III' represents a limit curve which leaves sufficient play to exceed curve I during control operations up to which, however, normally curve I will never be exceeded. The maximum runaway speed which occurs along the curve III' is obtained at point P, the contact point of curve III' with one of the curves of curve group II namely in this instance the curve $II_3$. This point P, which is thus common to both curves III' and $II_3$, simultaneously designates the predetermined maximum permissible runaway speed which must not be exceeded under any circumstances. Although curve III' meets this requirement, curve $II_3'$ is selected as actual limit curve in FIG. 1 which over a wide range corresponds to one of the curves of constant runaway speed of curve group II, in this instance to curve $II_3$. Within this range each point of the limiting curve $II_3'$, which assures a far greater liberty with regard to the permissible relationships between guide wheel opening $a_0$ and runner wheel opening $\varphi$ than does curve III', corresponds to the maximum permissible runaway speed determined by point P. In order safely to prevent said maximum permissible runaway speed or the selected limiting curve $II_3'$ from being exceeded, the limiting device will always be released or its operation initiated when such relationships between guide wheel opening $a_0$ and runner opening $\varphi$ occur which in the $a_0\varphi$ diagram are represented as points of a selected line train (III in FIG. 1) which is composed of ordinate and abscissa parallel sections.

As will be seen from FIG. 1, the abscissa section corresponds to certain guide wheel openings ($a_0'$, $a_0''$, $a_0'''$), and the ordinate sections correspond to certain runner wheel openings ($\varphi'$, $\varphi''$, $\varphi'''$) while the abscissa section corresponding to the smallest guide wheel opening $a_0$ and the ordinate section corresponding to the maximum runner wheel opening $\varphi$ are tangent to curve $II_3'$, and while one ordinate section each and abscissa section following in the direction toward a larger runner opening, intersect at the selected limiting curve $II_3'$ (in FIG. 1 for instance $\varphi'$ and $a_0''$, $\varphi''$ and $a_0'''$).

It will also be seen from FIG. 1 that the originally selected limiting curve $II_3'$ at least within the range where it corresponds to the curve of the same runaway speed $II_3$, namely is replaced by the actual, selected limiting curve III. FIG. 1 also shows that by corresponding fine steps, the step-shaped limiting curve III, i.e. by composing sufficient corresponding small ordinates and abscissa parallel sections, any desired good approximation to curve $II_3'$ can be obtained.

Figure 2:
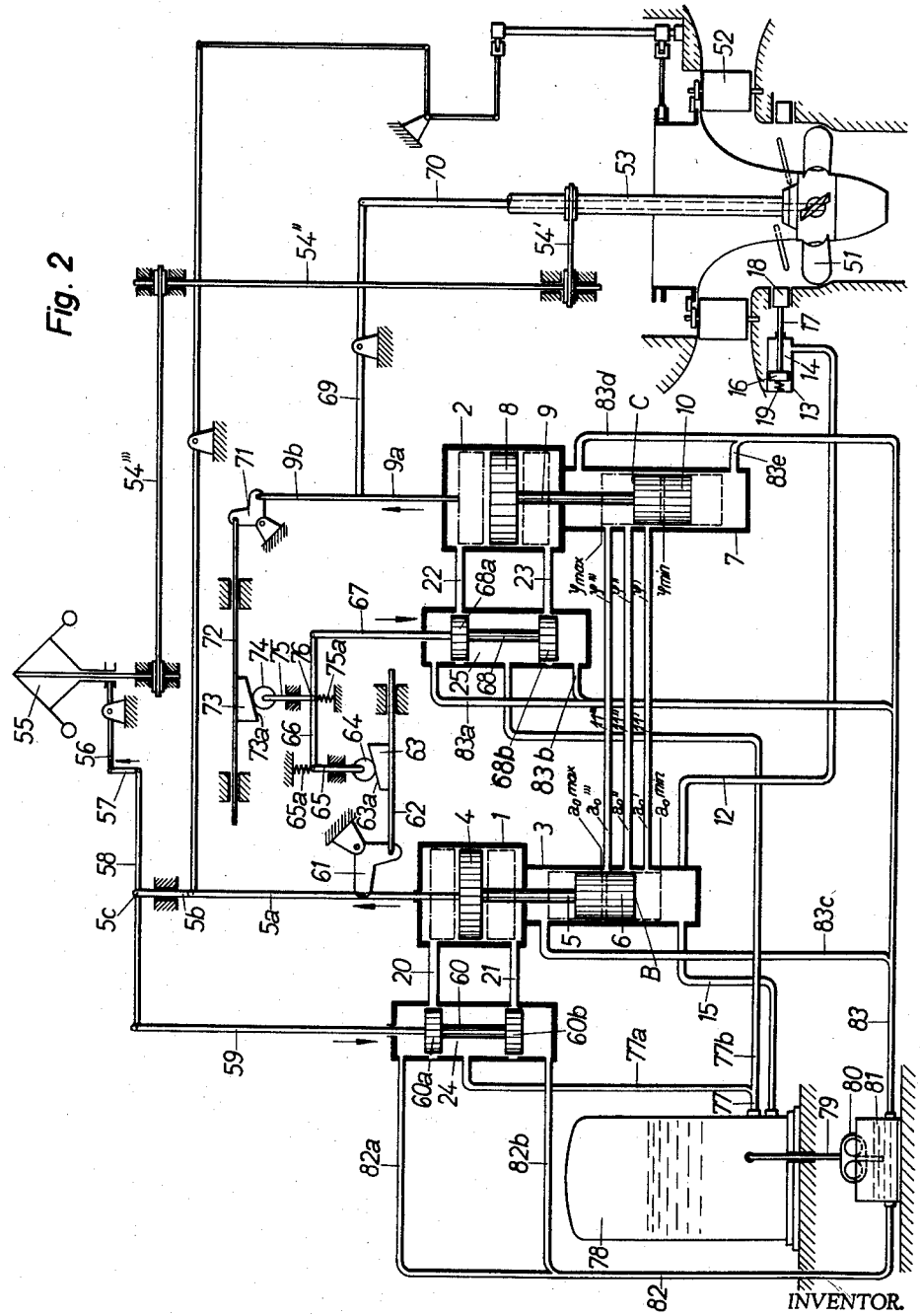

FIGURE 2 shows the runner blades 51 and the guide wheel blades 52 of a Kaplan turbine. The hollow turbine shaft 53 through the intervention of the connecting means 54', 54" and 54''' drives the centrifugal governor 55. Governor 55 through the intervention of the rotatably journalled lever 56 and link 57 actuates lever 58 and through the latter and link 59 actuates the valve spool 60 with the two pistons 60a and 60b of the guide wheel control valve 24. Valve 24 through the intervention of the connecting lines 20 and 21 controls the supply of pressure fluid to guide wheel servomotor 1 and thus the adjusting movement of the guide wheel servomotor piston 4 the piston rod 5a of which is indirectly connected to the guide wheel blades 52 in such a way that the guide wheel blades 52 will be open when piston 4 moves upwardly in the direction of the arrow. Piston rod 5a is linked at 5c to lever 58 through a return rod 5b. The adjusting movement of the guide wheel servomotor piston 4 is conveyed from piston rod 5a through the rotatably journalled angle lever 61, rod 62 and cam 63 connected thereto to roller 64 mounted on rod 65 connected to lever 66 which, in its turn, through rod 67 is connected to the valve spool 68 with pistons 68a and 68b of runner control valve 25. Valve 25 through the intervention of connecting lines 22 and 23 controls the supply of pressure fluid to runner servomotor 2 and thus controls the adjusting movement of the runner servomotor piston 8. Piston 8 is through the intervention of piston rod 9a, lever 69 linked thereto, and rod 70 connected to the runner blades 51 in such a way that the runner blades 51 will be opened when piston 8 moves upwardly in the direction indicated by the arrow. The return of the adjusting movement of the runner servomotor piston 8 is effected through the intervention of the return bar 9b connected to the piston rod 9a, angle lever 71, and rod 72 with cam 73 connected thereto, which latter, through roller 74 and rod 75, acts at the pivot 76 upon lever 66. For purposes of simplicity, the curve contours 63a and 73a of the cams 63 and 73 have been shown as straight lines and are so designed that the respective inertia point coincides with the $a_0$ value according to curve I of FIGURE 1. The rollers 64 and 74 are, by means of springs 65a and 75a, continuously pressed against the cams 63 and 73 or the cam paths 63a and 73a thereof.

The pressure oil is supplied to the control valve 24 in the chamber between the two pistons 60a and 60b of valve spool 60 through branch line 77a, and to control valve 25 into the chamber between the two pistons 68a and 68b of valve spool 68 through branch line 77b of a pressure oil line 77 which communicates with the compressed air container 78. Compressed air container 78 receives its pressure oil through conduit 79 by a pump 80 from an oil container 81 (the motor for driving the pump 80 is not shown). The branch lines 82a and 82b of a conduit 82 are designed for the discharge of oil from control valve 24 into oil container 81, and, similarly, the branch lines 83a and 83b of conduit 83 are designed for discharge of oil from control valve 25 into oil container 81.

Directly adjacent the guide wheel servomotor cylinder 1 and rigidly connected thereto is a cylinder 3 in which is guided a control piston 6 which is rigidly connected to the guide wheel servomotor piston 4 by piston rod 5. Similarly directly adjacent the runner servomotor cylinder 2 and rigidly connected thereto is a cylinder 7 in which is guided a piston 10 which is rigidly connected to runner servomotor piston 8 by a piston rod 9. Cylinders 3 and 7 communicate with each other through connecting lines 11', 11" and 11'''. Cylinder 3 communicates with cylinder 13 of the adjusting member 14 through conduit 12 which represents a relief conduit as well as a pressure fluid supply conduit. Cylinder 3 furthermore communicates through conduit 15 with the compressed air container 78. Guided in cylinder 13 of the control member 14 is a piston 16 which through piston rod 17 is connected to disturbing blades 18. A pressure spring 19 is arranged in cylinder 13. The branch conduit 83c of conduit 83 connects cylinder 3 with the oil container 81 and serves for the discharge of oil into the same. Similarly, the branch conduits 83d and 83e of conduit 83 connect cylinder 7 with oil container 81 and likewise serve for the discharge of oil into the same.

When the speed of the turbine drops, on account of an increase in the turbine load, the right-hand end of lever 58 will, due to the influence of governor 55, move upwardly in the direction indicated by the arrow. As a result thereof, lever 58 tilts about pivot 5c which is stationary for the time being and, through the intervention of rod 59, moves the valve spool 60 downwardly in the direction indicated by the arrow. The valve spool 60 by means of its two pistons 60a and 60b uncovers the conduits 20 and 21 so that pressure oil can flow from container 78 through conduits 77 and 77a, control valve 24 and line 21 to the bottom side of the guide wheel servomotor piston 4, while oil can flow from the top side of piston 4 through line 20, control valve 24 and lines 82a and 80 into the oil container 81. The guide wheel servo motor piston 4 moves upwardly in the direction of the arrow and through the piston rod 5a adjusts the guide wheel blades 52 in the direction of a larger guide wheel opening. Simultaneously, with the movement of the guide wheel servo motor piston 4, an upward movement of the pivot point 5c is initiated through the return rod 5b, which upward movement is conveyed through lever 58 and rod 59 to valve spool 60 to thereby return the latter to its starting or neutral position.

In conformity with the adjusting movement of the guide wheel servo motor piston 4, control piston 6, connected to piston 4 through piston rod 5, moves upwardly (with the guide wheel opening $a_o''$ in FIGURE 1) and frees, by means of its control edge B, the connecting line 11″. The pressure fluid continuously supplied from compressed air container 78 through line 15 into cylinder 3 and through line 12 into cylinder 13 of control member 14 is now able to flow through line 11 to the chamber in cylinder 7 above control piston 10, and discharge lines 83d and 83 into the oil container 81. As a result thereof, a considerable pressure drop will occur so that piston 16, which up to then was held in rest position by the pressure fluid in control member 14 against the pressure of spring 19, will be relieved on that side which faces the relief line 12 so that spring 19 will move piston 16 out of its rest position. During this movement, piston 16 will, through the intervention of rod 17, move the control blades 18 into the flow, and said blades 18 will prevent the racing speed from reaching a higher value than corresponds to the selected limiting curve III in FIGURE 1. This will occur even if the guide wheel blades 52 open further and conditions are obtained which correspond to higher racing speeds than the desired maximum permissible racing speed.

As has been mentioned above, and as has been illustrated in connection with FIGURE 1, the limiting curve III is so selected that it reaches the desired limiting curve $II_3'$ corresponding to the desired maximum permissible racing speed in the most unfavorable instances only, namely, where an ordinate section and an abscissa section of curve III intersect curve $II_3'$. However, in all other instances the limiting curve III remains below $II_3'$. In this way, it is assured that no higher racing speeds can occur than those corresponding to the predetermined maximum permissible racing speed.

Due to the adjusting movement of the guide wheel servo motor piston 4, the angle lever 61 linked thereto is by means of piston rod 5a tilted in clockwise direction whereby rod 52 with cam 63, which rod is linked to angle lever 61, will be moved toward the left. In conformity with the design of the cam path 63a, roller 64 and rod 65 will be adjusted upwardly against the thrust of spring 65a. As a result thereof, lever 66 is tilted about pivot 76 which for the time being is stationary so that rod 67 is moved downwardly in the direction of the arrow. Valve spool 68 now moves its pistons 68a and 68b to uncover the lines 22 and 23 so that oil under pressure can flow from compressed air container 78 through conduit 77 and 77b, control valve 25 and line 23 to the bottom side of the runner servo motor piston 8 while simultaneously oil can pass from the chamber above piston 8 through line 22, control valve 25 and lines 83a and 83 into oil container 81. Runner servo motor 8 now moves downwardly in the direction of the arrow and, through the intervention of piston rod 9a, valve 69, and rod 70, adjusts runner blades 51 in the direction of a greater runner opening. Together with the movement of the runner servo motor piston 8, the angle lever 71 is, by means of the return rod 9b, tilted in counterclockwise direction whereby rod 72 with cam 73 is moved toward the left. In conformity with the design of the cam path 73a, spring 75s through rod 75, is able to move roller 74 upwardly so that the latter will remain in contact with the cam path 73a. As a result thereof, also pivot 76, which so far has been stationary, will move upwardly and, together therewith, the right-hand end of lever 66 will likewise move upwardly whereby, through rod 67, valve spool 68 is returned to its starting or neutral position in the direction opposite to the direction of the arrow.

In conformity with the adjusting movement of the runner servo motor piston 8, control piston 10 connected thereto through piston rod 9 will also move upwardly and by means of its control edge C (with the runner wheel opening $\varphi''$ in FIGURE 1) will block the connecting line 11″. The oil under pressure conveyed from container 78 through line 15 into cylinder 3 cannot now flow through connecting line 11″ so that it will flow through line 12 into cylinder 13 of the control member 14 where it will return piston 16 to and hold the same in its starting position against the thrust of spring 19 so that, through the intervention of piston rod 17, the control blades 18 are pulled out of the liquid flow path whereby the speed limiting effect of the blades 18 is eliminated. The blades 18 thus remain effective until, by means of the lagging opening movement of the runner wheel servo motor 8, the runner opening has caught up with the guide wheel opening to such an extent that admissible ratios between guide wheel opening and runner opening have been established.

This procedure will be repeated with further opening of the guide wheel when reaching the guide wheel opening $a_o'''$ while the line 11‴ is freed and the pressure fluid can blow off through relief line 83d and 83 until the runner has moved up to the position $\varphi'''$. During this operation, each time the step-shaped limiting curve III of FIGURE 1 is exceeded by the respective relationship between guide wheel and runner, the piston 16 is moved out of its rest position and thus the blades 18 connected thereto will be actuated into effective position.

If, in distinction from the illustration in FIG. 2, the guide wheel adjustment is effected in conformity with the runner adjustment, it will be evident that with a control of guide wheel and runner wheel for a closing movement, likewise a limitation of the racing speed will be obtained in conformity with the step-shaped limiting curve III in FIG. 1. This is due to the fact that in such an instance the adjusting movement of the runner wheel will run ahead of that of the guiding wheel, and the control edge C of control piston 10 will successively release the connecting lines 11‴, 11″ and 11′ before the control edge B of the control piston 6 will successively again close said connecting lines.

A safe limitation of the racing speed will also prevail when the adjusting movement of the guide wheel runs ahead of the runner speed during an opening movement to such an extent that, for instance, the control edge B of control piston 6 frees the two connecting lines 11″ and 11‴ before the runner adjusting movement starts. This is due to the fact that, also, with such an opening movement of the guide wheel, immediately with the relief of the first arranged connecting line, i.e. 11″, the control member will be actuated. Corresponding remarks apply to a closing movement.

Figure 3:
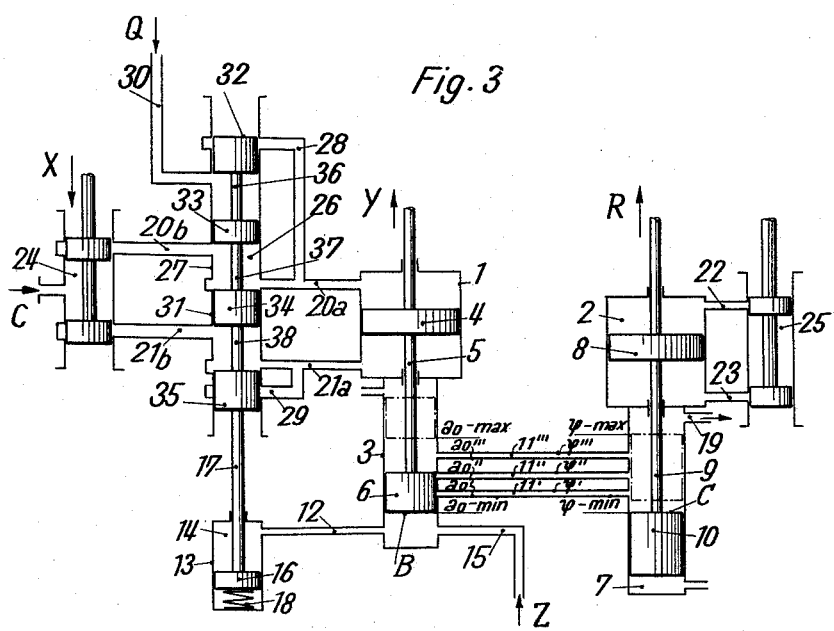
FIGURE 3 is a further embodiment of a limiting device according to the invention in which the control member actuates a control valve.

The embodiment shown in FIG. 3 in addition to comprising parts corresponding to those of FIG. 2 and designated with the same reference numerals, also comprises a control member in the form of a valve 26. Valve 26 is adapted to communicate through conduits 20a and 21a and the by-pass conduits 28 and 29 with the guide wheel servomotor 1 and furthermore through conduits 20b and 21b with the control valve 24. Cylinder 27 of valve 26 is furthermore adapted to communicate through a conduit 30 with a pressure fluid source (not shown in the drawings). Reciprocally mounted in cylinder 27 is a valve spool 31 which comprises four pistons 32, 33, 34 and 35 arranged in spaced relationship to each other and rigidly interconnected by rods 36, 37 and 38. Valve spool 31 is connected by rod 17 to piston 16 of the adjusting device 14 similar to the adjusting device 14 of FIG. 2.

If the control valve 24 is moved in the direction of the arrow X, pressure fluid from a pressure fluid source connection C passes through conduit 21b, cylinder 27 and conduit 21a into the cylinder of the guide wheel servomotor 1 and will act upon the bottom side of the piston 4. Consequently, piston 4 will move in the direction of the arrow Y so as to open the guide wheel. At the same time, pressure fluid will be discharged from the top side of piston 4 through conduit 20a, cylinder 27, conduit 20b and control valve 24. The by-pass conduits 28 and 29 are for the time being closed by pistons 32 and 35 of valve spool 31. At the same time, control piston 6 connected by piston rod 5 with piston 4 will move in cylinder 3 in the direction of the arrow Y. During this movement, its control edge B will release conduit 11' (when reaching curve III, FIG. 1). The pressure fluid continuously conveyed from a pressure fluid source (see arrow Z) through conduit 15 into cylinder 3 and through conduit 12 into cylinder 13 of the adjusting device 14 and holding piston 16 in its rest position against the thrust of spring 18, will now be discharged through conduit 11', cylinder 7 and relief conduit 19. As a result thereof, piston 16 will be relieved from pressure fluid and will be moved out of its rest position by the thrust of spring 18. Similarly, valve spool 31 connected to piston 16 by rod 17 will be moved in the same direction whereby the pistons 34 and 35 of valve spool 31 will block the conduits 20a and 21a. During this movement, the by-pass conduits 28, 29 remain first still blocked by pistons 32 and 35. Thus, all connecting conduits between cylinder 27 and the cylinder of servomotor 1 for the guide wheel are blocked. The piston 4 is thus blocked and cannot open the guide wheel any further.

In conformity with especially the adjusting speed of the adjusting device and of the servomotors 1 and 2, the limitation of the runaway speed may be effected in two ways.

*First Possibility of Limiting the Runaway Speed.*

Valve spool 31 moves further so that the pistons 32 and 35 will free the connections to the by-pass conduits 28 and 29, while the control conduits 20a and 21a remain blocked as before. As a result thereof, connection between the pressure conduit 30 and the by-pass conduit 28 will be established, and pressure fluid will pass from the pressure fluid source in the direction of the arrow Q through pressure conduit 30, cylinder 27 and by-pass conduit 28 or conduit 20a into the cylinder of the servomotor 1 for the guide wheel where it will act upon the top side of piston 4. At the same time, fluid can escape from the bottom portion of the cylinder below piston 4 through a portion of conduit 21a, the by-pass conduit 29 and cylinder 27 so that the piston 4 will move in a direction counter to the direction of the arrow Y. Thus, the guide wheel will be adjusted in closing direction. Simultaneously with the piston 4, control piston 6 is moved through the intervention of piston rod 5 in the same direction as piston 4. While so moving, the connecting conduit 11' will be closed by piston 6 so that the pressure fluid continuously fed into cylinder 13 of the adjusting device 14 will be prevented from escaping and will now return piston 16 to its rest position against the thrust of spring 18. During this operational phase, also valve spool 31 connected to piston 16 through the intervention of rod 17 will be returned to its starting position. When valve spool 31 is thus being returned to its starting position, the pistons 32, 34, 35 first block all connecting conduits 20a, 21a, 28 and 29 between cylinder 27 and the cylinder 1 of the guide wheel motor and also block the piston 4 as well as control piston 6 connected thereto. Subsequently, pistons 34 and 35 again release control conduits 20a and 21a so that an adjustment of the guide wheel will again be possible. Piston 16 will thus have been returned to its starting position prior to the guide wheel having reached a corresponding opening.

*Second Possibility of Limiting the Runaway Speed*

In the meantime, for instance through the intervention of a returning mechanism, also an adjusting movement of the runner servomotor has been initiated in opening direction, i.e. in the direction of the arrow R, and runner servomotor piston has followed the adjusting movement of the guide wheel servomotor piston 4 already to such an extent that control piston 10 will by means of its control edge C block the free connecting conduit 11' prior to a freeing of conduits 20a, 21a, 28 and 29 by a further adjusting movement of valve spool 31. The continuously fed pressure fluid will thus be prevented from further escaping through relief conduit 19, so that piston 16 of the adjusting device 14 will be acted upon by pressure fluid and will be returned to its rest position against the thrust of spring 18 before piston 32 has released the connection between pressure conduit 30 and by-pass conduit 28. It will thus be seen that without an additional closing impulse being effected by the pressure fluid source upon the top side of piston 4 through conduits 30 and 28, immediately after obtaining an opening angle $\varphi'$ of the runner, the short term blocking of the guide wheel is terminated again so that a further adjustment of the guide wheel will be possible. This operation is repeated in an analogous manner also when the runner opens from $\varphi'$ to $\varphi''$ or from $\varphi''$ to $\varphi'''$.

Also in this instance the actual limitation of the runaway speed is effected when a stepped limitation curve is reached (III in FIG. 1). This limitation curve approaches the selected limitation curve (II$_3'$ in FIG. 1) the closer, the more connecting conduits 11', 11", 11'''... are provided between the cylinders 3 and 7. Each connecting conduit corresponds to one step of the curve (III of FIG. 1). Thus, for instance, step $a_0''$, $\varphi''$ corresponds to the connecting conduit 11". By appropriately determining the adjusting speed of the adjusting device and of the servomotors, and by correspondingly design of the adjusting strokes and by correspondingly designing the outlet and inlet cross sections of the conduits, it will be realized that coordinations of guide wheel and runner openings above the elected limitation curve III cannot occur at all or only for such a short period that they will at least again return to curve III before the runway speed can reach a magnitude in excess of the predetermined maximum permissible magnitude.

If the guide wheel and runner are controlled in a closing direction, the limitation of the runaway speed along the stepped actual limitation curve (III in FIG. 1) will be effected in the same manner when the adjusting movement of the runner runs correspondingly further ahead of the adjusting movement of the guide wheel and in this connection the control edge C of control piston 10 releases the connecting conduits 11''', 11" and 11' before control edge B of control piston 6 blocks said connecting conduits. During this operation, the desired correction of the $a_o$, $\varphi$ coordination will be effected by the additional closing impulse upon the top side of the guide wheel servomotor piston as conveyed by a pressure fluid source through conduits 30 and 28 freed by piston 32 of valve spool 31.

Valve spool 31 may also be arranged between the control valve and the servomotor of the runner adjustment. In this instance the above outlined remarks apply analogously but in this instance the direction of movements of control piston and servomotor as indicated in FIG. 3 by the arrows will be effected for an adjustment in closing direction, and the additional impulse controlled by the piston will now act in an opening direction of the runner.

In a corresponding manner, control valves may be provided for the guide wheel and runner adjustment, which control valves will be actuated either together by an adjusting member or by two separate devices.

Figure 4:
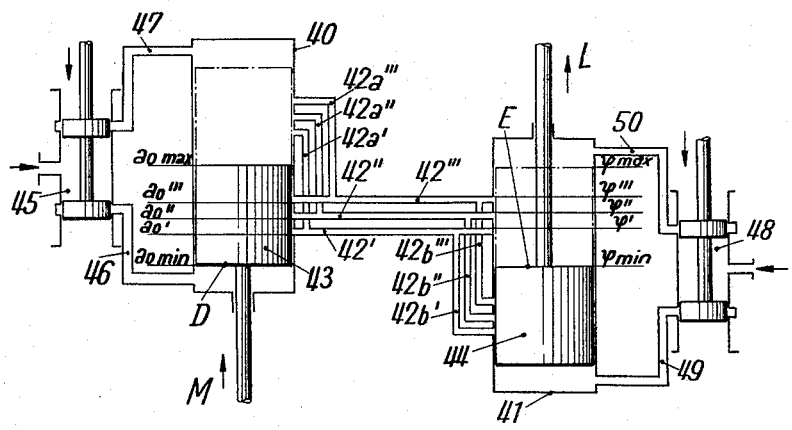
FIGURE 4 illustrates a still further embodiment of the invention in which a limiting device directly actuates the servomotors for the guide wheel blades and the runner blades, the arrows shown adjacent the piston rod of the guide wheel servomotor and of the runner servomotor corresponding to an adjustment in the direction of a greater opening from guide wheel to runner.

In FIGURE 4 is shown a modification having servomotors connected to the guide wheel and runner in the same manner as described for FIGURE 2.

According to the arrangement of FIG. 4, connecting conduits 42', 42" and 42'" are arranged between the cylinder 40 of the guide wheel servomotor and the cylinder 41 of the runner servomotor. Branching off from these connecting conduits are by-pass conduits 42a', 42a" and 42a'" as well as 42b', 42b" and 42b'". These two groups of by-pass conduits respectively lead into guide wheel servomotor cylinder 40 and runner servomotor cylinder 41 while being spaced from the respective mouth of the connecting conduits 42', 42" and 42'" by precisely the length of the guide wheel servomotor piston 43 and runner servomotor piston 44 respectively. By way of example, it may be assumed that the guide wheel adjustment always runs ahead of the runner adjustment, as is the case when a governor acts directly upon the guide wheel adjustment only and the latter controls the runner adjustment. In such an instance, the operation is as follows:

If the governor controls the guide wheel control valve 45 so as to open the guide wheel, pressure fluid can, through control conduit 46, pass into cylinder 40 and act upon the bottom side of piston 43. Inasmuch as at the same time the control conduit 47 for the discharge of pressure fluid is opened, piston 43 moves from its illustrated closing position in the direction of the arrow M. While in the meantime, due to the opening adjusting movement of piston 43, also the runner control valve 48 is adjusted for an opening movement, so that pressure fluid can pass through conduit 49 into the cylinder 41 to act upon the bottom side of piston 44 and fluid can escape through conduit 15 on the upper side of piston 44, so that the runner servomotor piston 44 will likewise be moved from its illustrated closing position in the direction of the arrow L, control edge D of piston 43 will free conduit 42'. Thus, the pressure fluid can be discharged from cylinder 40 below the bottom side of piston 43 through conduit 42' and control conduit 50. As a result thereof, the pressure upon the lower side of piston 43 is almost completely relieved. At the same time, however, pressure fluid also passes through conduit 42a' to the upper side of piston 43 so that the same pressure will now prevail on both sides of piston 43, and piston 43 will, therefore, come to a standstill even if the valve spool of valve 45 should not yet have returned to its starting position. A further adjustment of piston 43 and thus of the guide wheel will be possible only when piston 44 and thus the runner have been adjusted to such an extent that control edge E of piston 44 closes conduit 42'. When this occurs, it will simultaneously open the by-pass conduit 42b' so that pressure fluid will, through conduit 49 and cylinder 41, pass into the by-pass conduit 42b' and from here into the conduit 42'. The discharge from conduit 42' through cylinder 41 and control conduit 50 is, however, blocked at this time. The full pressure of the pressure fluid now passing through conduit 49, cylinder 41 and by-pass conduit 42b' will now be effective in connecting conduit 42' in the direction toward cylinder 40. Those open angles of guide wheel and runner which pertain to the position of pistons 43 and 44 reached so far have been designated with the characters $a_o'$ and $\varphi'$ corresponding to curve III of FIG. 1. If the valve spool of control valve 45 is adjusted in an opening direction of the guide wheel, the pressure fluid coming in through the two control conduits 46 and 49 will bring about an increase in pressure upon the bottom side of piston 43. This is due to the fact that the entire pressure fluid cannot be discharged to the same extent through the by-pass conduits 42a'. Consequently, piston 43 moves on and first closes the by-pass conduit 42a'. During the further course, the same procedure is repeated when the control edge D of piston 43 releases first conduit 42' and finally conduit 42'". The opening values $a_o''$ and $\varphi''$, and $a_o'''$ and $\varphi'''$ of FIG. 1 respectively correspond to said last mentioned positions.

With a control operation directed to an opening adjusting movement of guide and runner wheel, the limiting device comprising the connecting lines 42', 42" and 42'" as well as the bypass conduits 42a", 42a'" and 42b" and 42b'" will not become effective so that the runner wheel servomotor piston 44 could run ahead of the guide wheel servomotor piston 43 if this were not prevented by the adjustment of the runner wheel in conformity with the adjustment of the guide wheel. The limiting device thus prevents the guide wheel servomotor piston 43 from running ahead of the runner wheel servomotor piston 44 beyond the fixed step-shaped limiting curve III of FIG. 1.

When the guide wheel and runner are adjusted in closing direction, however, the adjusting movement of the guide wheel servomotor 43 is completely independent from the adjusting movement of the runner servomotor piston 44 which means that the guide wheel servomotor piston 43 may run ahead of the runner servomotor piston 44. In a manner corresponding to that described in connection with the opening procedure, the runner servomotor 44 will now be prevented from running ahead of the guide wheel servomotor 43 beyond the predetermined limitation curve.

It will thus be evident from the above that all combinations of guide wheel opening $a_o$ and runner opening $\varphi$ are possible below the predetermined limitation curve, whereas these cannot exceed said predetermined limitation curve with regard to too great a guide wheel opening $a_o$ or too small a runner opening $\varphi$. Consequently, also the runaway speed cannot reach a magnitude in excess of the predetermined maximum permissible value.

It is, of course to be understood that the present invention is, by no means, limited to the particular constructions shown in the drawings but also comprises any modifications within the scope of the appended claims.

What I claim is:

1. A Kaplan turbine having an adjustable guide wheel and an adjustable runner, a hydraulically operable servomotor having a piston operatively connected to said guide wheel for adjusting the same, a hydraulically operable servomotor having a piston operatively connected to said runner for adjusting the same, control means operatively connected to said two servomotors having a piston for adjusting the same, a speed responsive governor driven in unison with the turbine and operatively connected to said control means, and means controlled by said pistons of said two servomotors and operable to limit the runaway speed of the turbine to predetermined maximum permissible values which in an $a_o$ $\varphi$ diagram, wherein $a_o$ is the guide wheel opening and $\varphi$ is the runner opening, correspond to points of a selected train of lines composed of individual sections parallel to the ordinate and abscissa, respectively, and corresponding to guide wheel and runner openings of different magnitude, said train of lines approximating a selected limit curve of a predetermined desired maximum permissible runaway speed to such an extent that each ordinate section located between two adjacent abscissa sections intersects at the selected limit curve with that abscissa section which corresponds to the greater guide wheel opening, runaway speed limiting means only being effective when guide wheel opening $a_0$ and runner opening $\varphi$ relationships corresponding to a point of said selected train of lines in said $a_0\varphi$-diagram are reached.

2. A Kaplan turbine having an adjustable guide wheel and an adjustable runner, a first hydraulically operable servomotor having a piston operatively connected to said guide wheel for adjusting the same, a second hydraulically operable servomotor having a piston operatively connected to said runner for adjusting the same, control means operatively connected to the pistons of said two servomotors for adjusting the same, a speed responsive governor driven in unison with the turbine and operatively connected to said control means, at least one adjusting device comprising a fluid operable member connected to a variable flow control member of the turbine to be controlled, means continuously biasing said fluid operable member in a direction to make said flow control member effective, two cylinder piston systems, the piston of the one of said systems being operatively connected to the piston of said guide wheel servomotor and the piston of the other of said systems being operatively connected to the piston of said runner servomotor, a plurality of connecting conduits interconnecting spaced points along the respective cylinders of said two systems for successive control of the said conduits by said pistons of said two systems, pressure conduit means adapted to be connected to a pressure fluid source and leading to one side of the system piston associated with said guide wheel servomotor piston and also communicating with the side of said fluid operable member which is effective for making said flow control member ineffective, discharge conduit means communicating with the cylinder of the system cylinder associated with said runner servomotor for discharging fluid from said pressure fluid source and any of said connecting conduits that are uncovered by the piston pertaining to the cylinder, the piston of one of said systems running ahead of the other thereof in the opening direction to cause said pressure conduit means to communicate successively with said connecting conduits whereas the piston of the other system lags behind the said piston of said one system and successively blocks the connecting conduits in the same sequence, the piston of said other system running ahead of the piston of said one system in closing direction and successively connecting said connecting conduits with said discharge conduit means whereas the piston of said one system successively interrupts communication of said pressure conduit means with said connecting conduits in the same sequence.

3. A Kaplan turbine having an adjustable guide wheel and an adjustable runner, a first hydraulically operable servomotor having a piston operatively connected to said guide wheel for adjusting the same, a second hydraulically operable servomotor having a piston operatively connected to said runner for adjusting the same, control means operatively connected to the pistons of said two servomotors for adjusting the same, a speed responsive governor driven in unison with the turbine and operatively connected to said control means, at least one adjusting device comprising a fluid operable member for connection with a variable flow control member of the turbine to be controlled, first and second cylinder piston systems, the piston of the first said systems being operatively connected to the piston of said guide wheel servomotor and the piston of the second said systems being operatively connected to the piston of said runner servomotor, a plurality of connecting conduits interconnecting spaced points along the respective cylinders of said two systems for successive control of the conduits by said pistons of said two systems, pressure conduit means adapted to be connected to the pressure fluid source operable for conveying pressure fluid to the side of said fluid operable member which is effective for making said flow control member ineffective, additional conduit means for establishing communication between the said side of said fluid operable member and one side of said system piston associated with said guide wheel servomotor, means continuously acting upon the other side of said fluid operable member for urging the same in a direction opposite to the direction of movement adapted to be brought about by pressure fluid acting on said one side of said fluid operable member, and discharge conduit means communicating with the piston of the cylinder piston system pertaining to said runner servomotor.

4. An arrangement according to claim 3, which includes a check valve in said additional conduit means near said adjusting device and also includes an adjustable discharge throttle interposed between said adjusting device and said check valve.

5. A Kaplan turbine having an adjustable guide wheel and an adjustable runner, a hydraulically operable servomotor having a piston operatively connected to said guide wheel for adjusting the same, a hydraulically operable servomotor having a piston operatively connected to said runner for adjusting the same, control means operatively connected to the pistons of said two servomotors for adjusting the same, a speed responsive governor driven in unison with the turbine and operatively connected to said control means, at least one adjusting device comprising a fluid operable member connected with at least one adjustable blade means for adjusting the same, two cylinder piston systems, the piston of the one of said systems operatively connected to the piston of said guide wheel servomotor and the piston of the other of said systems operatively connected to the piston of said runner servomotor, a plurality of connecting conduits arranged in spaced relationship to each other and interconnecting the cylinders of said two systems at spaced points therealong, said connecting conduits being arranged for successive control by said pistons of said two systems, pressure conduit means adapted to be connected to a pressure fluid source and leading to one side of the system piston associated with said guide wheel servomotor piston and also communicating with one side of said fluid operable member, discharge conduit means communicating with said runner servomotor cylinder for discharging fluid from said pressure fluid source and any one of said connecting conduits, and valve means for controlling said discharge conduit means, said fluid operable member being operable in response to reduction in pressure in said pressure conduit means to adjust the adjustable blade means connected thereto in closing direction so as to prevent the turbine from reaching a speed higher than predetermined maximum permissible runaway speed.

6. A Kaplan turbine having an adjustable guide wheel and an adjustable runner, a hydraulically operable servomotor having a piston operatively connected to said guide wheel for adjusting the same, a hydraulically operable servomotor having a piston operatively connected to said runner for adjusting the same, control means operatively connected to the pistons of said two servomotors for adjusting the same, a speed responsive governor driven in unison with the turbine and operatively connected to said control means for adjusting the same, at least one adjusting device comprising a fluid operable member connected with a variable flow control member of the turbine to be controlled, two cylinder piston systems, the piston of the one of said systems operatively connected to the piston of said guide wheel servomotor and the piston of the other of said systems operatively connected to the piston of said runner servomotor, a plurality of connecting conduits arranged in spaced relationship to each other and terminating in points in the cylinders of said two systems for successive control by said pistons of said two systems, pressure conduit means connected to a pressure fluid source and leading to one side of the system piston associated with said guide wheel servomotor piston and also communicating with one side of said fluid operable member, discharge conduit means communicating with said runner servomotor for discharging fluid from said pressure fluid source and any one of said connecting conduits, and valve means for controlling said discharge conduit means, control valve means associated with said two servomotors, conduit means respectively connecting said control valve means with the servomotor pertaining thereto, and a control device arranged in the conduit between one of said servomotors and the control valve means pertaining thereto, said control device comprising a cylinder and a valve spool reciprocably mounted in said cylinder and provided with a plurality of interconnected axially spaced pistons, said valve spool being connected to said fluid operable member for movement thereby.

7. A Kaplan turbine having an adjustable guide wheel and an adjustable runner, a hydraulically operable servomotor having a piston operatively connected to said guide wheel for adjusting the same, a hydraulically operable servomotor having a piston operatively connected to said runner for adjusting the same, control means operatively connected to the pistons of said two servomotors for adjusting the same, a speed responsive governor driven in unison with the turbine and operatively connected to said control means for adjusting the same, a plurality of connecting conduits leading from the cylinder of said guide wheel servomotor to the cylinder of said runner servomotor, the number of said connecting conduits corresponding to the number of steps of a selected stepped limiting curve, the connection of said connecting conduits with the cylinders of said servomotors being spaced from each other in axial direction of the piston movement of said servomotors and being successively controlled by the adjacent pistons of said servomotors, first by-pass conduit means corresponding in number to said connecting conduits and respectively communicating with said connecting conduits and leading into the cylinder of said guide wheel servomotor for by-passing the connection of said connecting conduits with the cylinder of said runner servomotor, the pistons of said servomotors being operable to release and block the inlet and outlet of said connecting conduits and said conduit means.

8. An arrangement according to claim 6, in which the connections of the connecting conduits with the cylinders of said servomotors are spaced from the connections of the by-pass conduit means with the respective cylinders of said servomotors by precisely the length of the pistons of the respective servomotors pertaining thereto.

9. A Kaplan turbine having an adjustable guide wheel and an adjustable runner, a first hydraulically operable servomotor having a piston operatively connected to said guide wheel for adjusting the same, a second hydraulically operable servomotor having a piston operatively connected to said runner for adjusting the same, control means operatively connected to said piston of said first servomotor for adjusting the same and also operatively connected to said piston of said second servomotor for adjusting the same, a speed responsive governor driven in unison with the turbine and operatively connected to said control means, two cylinder piston systems, the piston of the one of said systems being operatively connected to said piston of said first servomotor and the piston of the other of said systems being operatively connected to said piston of said second servomotor, a plurality of first connecting conduit means interconnecting spaced points along the respective cylinders of said two systems and being successively controlled by said pistons of said two systems as said pistons move, at least one adjusting device for controlling fluid flow through the turbine and comprising a moveable flow control member and a fluid operable actuating member operatively connected thereto, pressure means acting upon one side of said fluid operable member, pressure conduit means connected to a pressure fluid source and leading to one side of the piston of said one of said cylinder piston system and also communicating with other side of said fluid operable actuating member, discharge conduit means connected to the cylinder of the other of said cylinder piston systems for discharging fluid from said pressure fluid source by way of any one of said connecting conduits, the arrangement being such that at a permissible guide wheel and runner opening relationship said connecting conduit means are blocked by the pistons of said cylinder piston systems and said fluid operable actuating member is retained in a rest position by the pressure acting on said other side of said fluid operable actuating member, and that at a certain other guide wheel and runner opening relationship the said connecting conduit means are opened by said pistons of said cylinder piston system whereby the pressure acting on said other side of said fluid operable actuating member is released for movement of said fluid operable actuating member out of its rest position under the action of the said pressure means acting upon said one side of said fluid operable actuating member.

10. An arrangement according to claim 9, which includes a control arrangement operatively connected to said adjusting device and adapted in response to the occurrence of guide wheel and runner relationship corresponding to a predetermined runaway speed limiting curve first to block any further adjusting movement of the piston of one of the two servomotors and thereupon to bring about an adjusting movement of the servomotor piston to adjust the same to a permissible $a_o$ $\varphi$ coordination.

References Cited in the file of this patent

UNITED STATES PATENTS

| 1,607,833 | Lieber | Nov. 23, 1926 |
| 1,872,165 | Moody | Aug. 16, 1932 |
| 2,115,890 | Thoma | May 3, 1938 |

FOREIGN PATENTS

| 201,177 | Australia | Feb. 22, 1956 |
| 1,156,004 | France | Dec. 9, 1957 |
| 1,035,481 | Germany | July 31, 1958 |